(12) United States Patent
Borst et al.

(10) Patent No.: US 7,941,156 B2
(45) Date of Patent: May 10, 2011

(54) SYSTEM OF WIRELESS BASE STATIONS EMPLOYING SHADOW PRICES FOR POWER LOAD BALANCING

(75) Inventors: Simon C. Borst, Convent Station, NJ (US); Iraj Saniee, New Providence, NJ (US); Philip Alfred Whiting, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/721,315

(22) Filed: Mar. 10, 2010

(65) Prior Publication Data

US 2010/0184480 A1 Jul. 22, 2010

Related U.S. Application Data

(62) Division of application No. 11/095,347, filed on Mar. 31, 2005, now Pat. No. 7,729,704.

(51) Int. Cl.
*H04W 72/00* (2009.01)

(52) U.S. Cl. ........................................ 455/453; 455/450

(58) Field of Classification Search .................. 455/453, 455/452.1, 436, 452.2, 450, 432.1, 435.1, 455/435.2, 445, 522, 561; 370/280, 281, 370/331
See application file for complete search history.

(56) References Cited

U.S. PATENT DOCUMENTS

| | | | |
|---|---|---|---|
| 5,697,053 A | 12/1997 | Hanly | |
| 6,069,871 A | 5/2000 | Sharma et al. | |
| 6,128,500 A | 10/2000 | Raghavan et al. | |
| 6,195,551 B1 | 2/2001 | Kim et al. | |
| 6,236,866 B1 | 5/2001 | Meyer et al. | |
| 6,253,087 B1 | 6/2001 | Corbett | |
| 6,400,335 B1 | 6/2002 | Weaver et al. | |
| 6,515,975 B1 | 2/2003 | Chheda et al. | |
| 6,628,639 B1 | 9/2003 | Ishii | |
| 6,813,255 B1 | 11/2004 | Goderis et al. | |
| 6,985,439 B2 | 1/2006 | Hosein | |
| 7,016,320 B1 | 3/2006 | Petersson et al. | |
| 7,187,934 B2 * | 3/2007 | Turina et al. | .................. 455/453 |
| 7,313,113 B1 | 12/2007 | Hills et al. | |
| 2002/0128014 A1 | 9/2002 | Chen | |

(Continued)

OTHER PUBLICATIONS

An Algorithm for Combined Cell-Site Selection and Power Control to Maximize Cellular Spread Spectrum Capacity; Stephen V. Hanly; IEEE Journal on Selected Areas in Communications, vol. 13, No. 7, Sep. 1995; pp. 1332-1340.

(Continued)

*Primary Examiner* — George Eng
*Assistant Examiner* — Christopher M Brandt
(74) *Attorney, Agent, or Firm* — Hitt Gaines, P.C.

(57) ABSTRACT

In one aspect, a system is provided. In one embodiment, the system includes a plurality of wireless base stations that are located in a contiguous spatial coverage region of a cellular communication system. Each wireless base station that is configured to generate a coverage pilot beam to enable wireless mobile devices to set up spread spectrum wireless communication links with the generating wireless base station. The wireless base stations are configured to transmit data to the wireless mobile devices to cause a portion of the wireless mobile devices to reselect ones of wireless base stations for wireless communication links in a manner that reduces power load imbalances between the wireless base stations. The transmitted data is indicative of a set of shadow prices, wherein each of the wireless base stations is associated with a corresponding one of the shadow prices.

6 Claims, 5 Drawing Sheets

U.S. PATENT DOCUMENTS

| | | | |
|---|---|---|---|
| 2002/0160767 | A1 | 10/2002 | Hanly |
| 2002/0167907 | A1 | 11/2002 | Sarkar et al. |
| 2002/0193133 | A1 | 12/2002 | Shibutani |
| 2003/0134641 | A1 | 7/2003 | Gustafsson |
| 2004/0077354 | A1 | 4/2004 | Jason et al. |
| 2004/0132460 | A1 | 7/2004 | Lee |
| 2004/0185864 | A1 | 9/2004 | Balachandran et al. |
| 2004/0190486 | A1 | 9/2004 | Oshiba |
| 2004/0196787 | A1 | 10/2004 | Wang et al. |
| 2004/0248581 | A1 | 12/2004 | Seki et al. |
| 2005/0003824 | A1 | 1/2005 | Siris |
| 2005/0059408 | A1 | 3/2005 | Tiedemann, Jr. et al. |
| 2005/0096077 | A1 | 5/2005 | Moon |
| 2005/0153703 | A1 | 7/2005 | Juntti et al. |
| 2006/0014544 | A1* | 1/2006 | Tolli .............................. 455/453 |
| 2006/0114825 | A1 | 6/2006 | McAuley et al. |
| 2006/0171347 | A1 | 8/2006 | Attar et al. |
| 2006/0223545 | A1 | 10/2006 | Borst et al. |

OTHER PUBLICATIONS

A Framework for Uplink Power Control in Cellular Radio Systems; Roy D. Yates; IEEE Journal on Selected Areas in Communications, vol. 13, No. 7, Sep. 1995; pp. 1341-1347.

Integrated Power Control and Base Station Assignment; Roy D. Yates; IEEE Transactions on Vehicular Technology, vol. 44, No. 3, Aug. 1995; pp. 638-644.

Dynamic Optimization in Future Cellular Networks; Simon C. Borst et al.; Bell Labs Technical Journal 10(2), 99-119 (2005) Lucent Technologies Inc. Published by Wiley Periodicals, Inc. Published online in Wiley InterScience (www.interscience.wiley.com).

Joint Optimal Channel Base Station and Power Assignment for Wireless Access; Symeon Papavassiliou; IEEE/ACM Transactions on Networking, vol. 4, No. 6, Dec. 1996; pp. 857-872.

Cell Size Adaptation in W-DCMA Cellular System; Koichiro Goto et al.; Department of Electrical & Electronics Engineering, Sophia University; 2002 IEEE; p. 444-448.

Coordinated Load Balancing, Handoff/Cell-site Selection, and Scheduling in Multi-cell Packet Data Systems; Aimin Sang et al.; MobiCom '04, Sep. 26-Oct. 1, 2004, Philadelphia, Pennsylvania, USA.; p. 302-314.

Dynamic Load Balancing Through Coordinated Scheduling in Packet Data Systems; Suman Das et al.; Wireless Technology Research Lucent Technology Research Lucent Technologies, Bell Labs. 600 Mountain Ave., Murray Hill, NJ 07974; IEEE Infocom 2003; 11 Pages.

Downlink Power Control and Base Station Assignment; Farrokh Rashid-Farrokhi et al.; IEEE Communications Letters, vol. 1, No. 4, Jul. 1997; pp. 102-104.

* cited by examiner

FIG. 7

SYSTEM OF WIRELESS BASE STATIONS EMPLOYING SHADOW PRICES FOR POWER LOAD BALANCING

CROSS-REFERENCE TO RELATED APPLICATION

This application is a divisional application of currently U.S. patent application Ser. No. 11/095,347, entitled "POWER LOAD BALANCING IN CELLULAR NETWORKS," filed on Mar. 31, 2005 now U.S. Pat. No. 7,729,704, by Simon C. Borst, et al., which is commonly assigned with the present application and is incorporated herein by reference in its entirety.

TECHNICAL FIELD

The invention relates to cellular communication apparatus and methods for supporting voice communications.

BACKGROUND

This section introduces aspects that may be helpful in facilitating a better understanding of the disclosure. Accordingly, the statements of this section are to be read in this light and are not to be understood as admissions about what is in the prior art or what is not in the prior art.

Some wireless communication systems support spread spectrum communication formats such as code division multiplex access.

Figure 1:
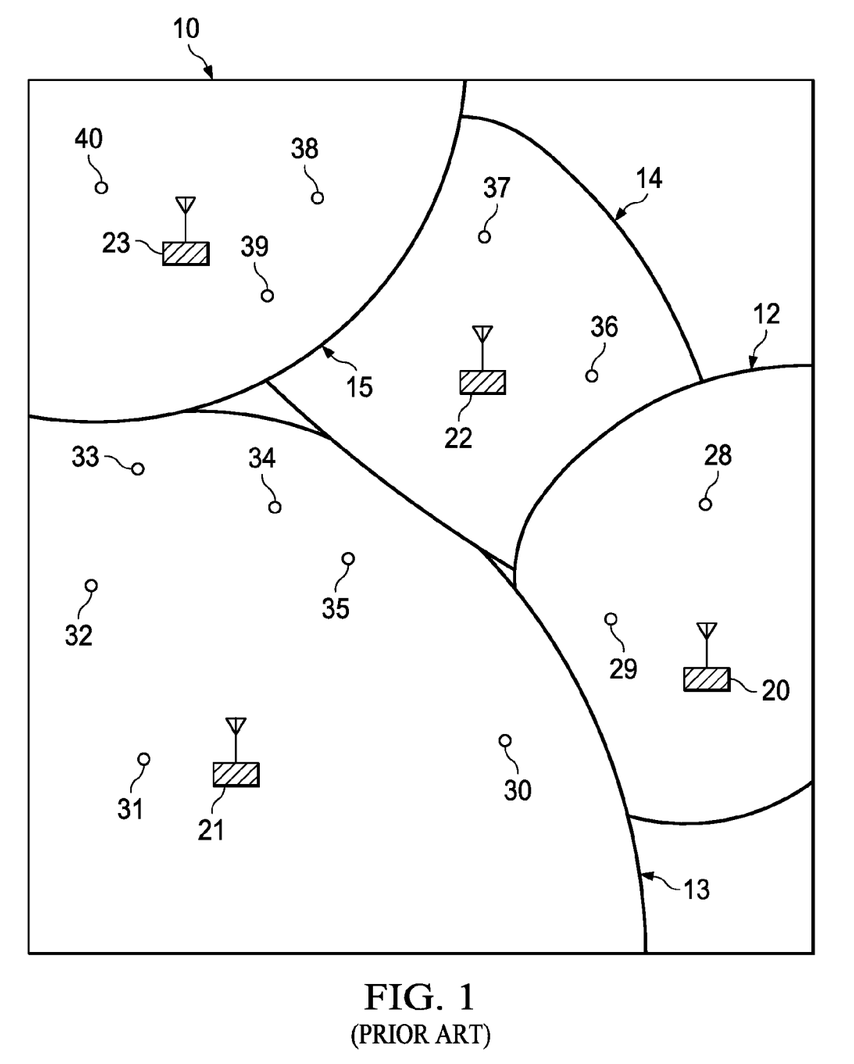
FIG. 1 is a top view of a contiguous spatial coverage region of a prior art cellular communication system.

FIG. 1 shows a portion of a wireless cellular communication system 10 that supports spread spectrum communication formats. The shown portion of the wireless cellular communication system 10 includes cells 12, 13, 14, 15. The cells 12-15 provide coverage for wireless voice communications from and to a contiguous spatial region that preferably does not have large coverage holes.

Each cell 12-15 includes an associated wireless base station 20, 21, 22, 23. Each wireless base station 20-23 maintains a wireless link with wireless mobile devices 28, 29, 30, 31, 32, 33, 34, 35, 36, 37, 38, 39, 40 located in the associated cell 12-15. In particular, each wireless base station 20-23 generates a pilot beam that enables the wireless mobile devices 28-40 in the associated cell 12-15 to set up the wireless link with the wireless base station 20-23 of the same cell 12-15. Each wireless base station 20-23 provides a communication link between the wireless mobile devices 28-40 in the associated cell 20-23 and a standard communication network such as the public telephone network.

In the wireless communication system 10, very different numbers of wireless mobile devices 28-40 may be located in different ones of the cells 12-15. For that reason, the different cells 12-15 may support very different amounts of wireless communication traffic. In spread spectrum systems, the amount of communication traffic strongly correlates to the amount of interference experienced by the wireless mobile devices 28-40. For that reason, it has often been desirable to balance communication loads between neighboring cells. Since spatial distributions of the wireless mobile devices 28-40 often changed over short time periods, it was also preferable to perform such balancing of cell loads dynamically.

One method for dynamical balancing of cell loads is based on cell breathing. Cell breathing involves dynamically changing the sizes of the cells 12-15 of the cellular communication system 10. Such cell breathing is implemented by changing powers of pilot beams of the cells 12-15, i.e., to shrink or expand selected ones of the cells 12-15. By appropriately varying the powers of pilot beams in neighboring cells 12-15, cell boundaries can be displaced in a manner that reduces differences in wireless communication traffic between the various cells 12-15.

Figure 2:
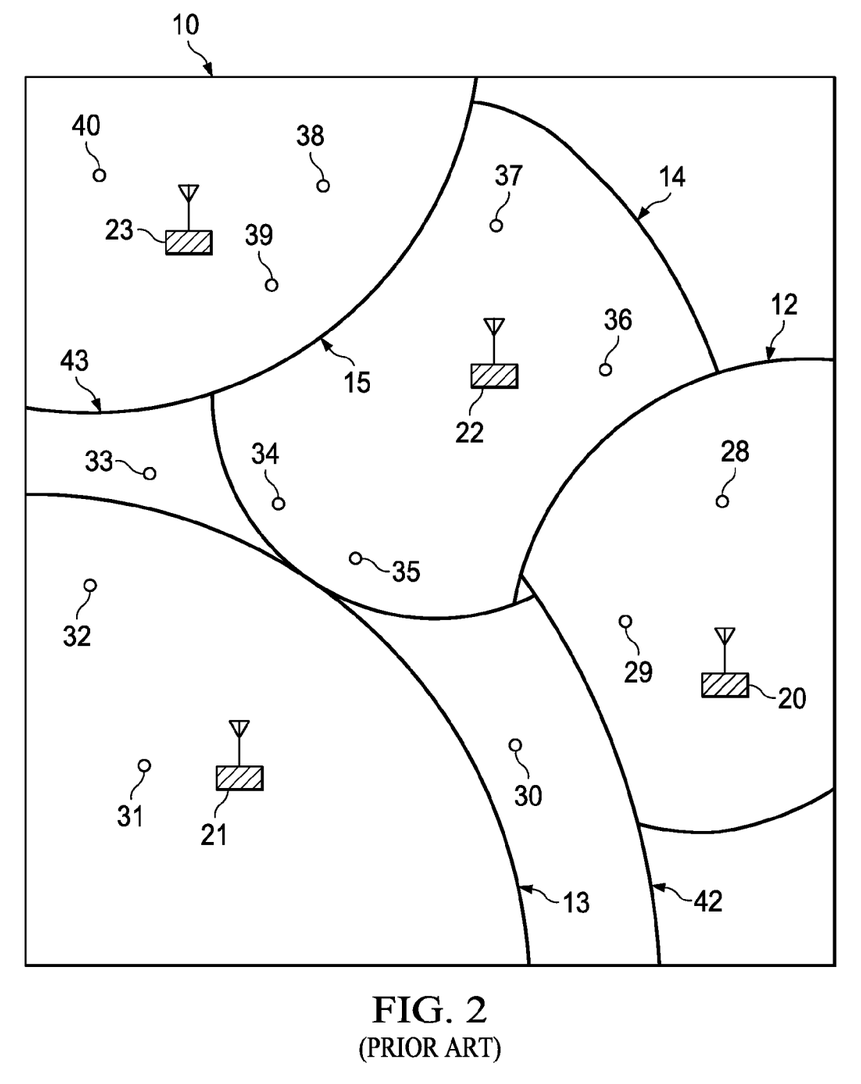
FIG. 2 is a top view of the contiguous spatial region of FIG. 1 after a cell-breathing transformation.

FIG. 2 illustrates the effect of a cell-breathing transformation on the portion of the wireless communication system 10 shown in FIG. 1. The cell-breathing transformation has shrunk the cell 13 in response to that cell 13 having a relatively heavier traffic load in the state of FIG. 1 and has expanded cell 14 in response to that cell 14 having a relatively lighter traffic load in the state of FIG. 1. The cell breathing has reduced the traffic load imbalance by moving cell-boundaries so that wireless mobile devices 34-35 were displaced from the cell 13 with the heavier initial traffic load to the neighboring cell 14 with the lighter initial traffic load.

While such cell-breathing transformations can aid to reduce load imbalances between the cells of the wireless communication system, cell breathing often produces coverage holes. In particular, a cell-breathing transformation usually involves reconfiguring wireless hardware devices such as transmitters of pilot beams. Due to geometric and/or physical constraints, such hardware reconfigurations often produce new spatial cells that incompletely cover the initial coverage region for the wireless communication system. For example, the cell-breathing transformation produced the state of FIG. 2, which includes two large coverage holes 42, 43. Due to geometric and/or physical constraints, none of the pilot beams of adjacent cell 12-15 serves the coverage holes 42, 43.

By generating such coverage holes, cell-breathing transformations can produce situations where some wireless mobile devices 30, 33 are not served by any of the neighboring cells. This deficiency of cell breathing is obviously undesirable in a cellular communication system.

SUMMARY

In one aspect, a system is provided. In one embodiment, the system includes a plurality of wireless base stations that are located in a contiguous spatial coverage region of a cellular communication system. Each wireless base station that is configured to generate a coverage pilot beam to enable wireless mobile devices to set up spread spectrum wireless communication links with the generating wireless base station. The wireless base stations are configured to transmit data to the wireless mobile devices to cause a portion of the wireless mobile devices to reselect ones of wireless base stations for wireless communication links in a manner that reduces power load imbalances between the wireless base stations. The transmitted data is indicative of a set of shadow prices, wherein each of the wireless base stations is associated with a corresponding one of the shadow prices.

BRIEF DESCRIPTION

Some embodiments of apparatus and/or methods in accordance with embodiments of the disclosure are now described, by way of example only, and with reference to the accompanying drawings, in which.

Herein, like reference numbers indicate functionally similar structures and/or features.

DETAILED DESCRIPTION

Various embodiments provide methods for causing some wireless fixed and/or mobile devices to change their selections of wireless base stations for wireless voice or data communication links. The wireless mobile devices may change their selections of wireless base stations in manners that reduce power load imbalances between different wireless base stations of the cellular communication system. Nevertheless, the changes of wireless base station selections are made without the production of holes in the spatial coverage region of the cellular communication system.

Figure 3:
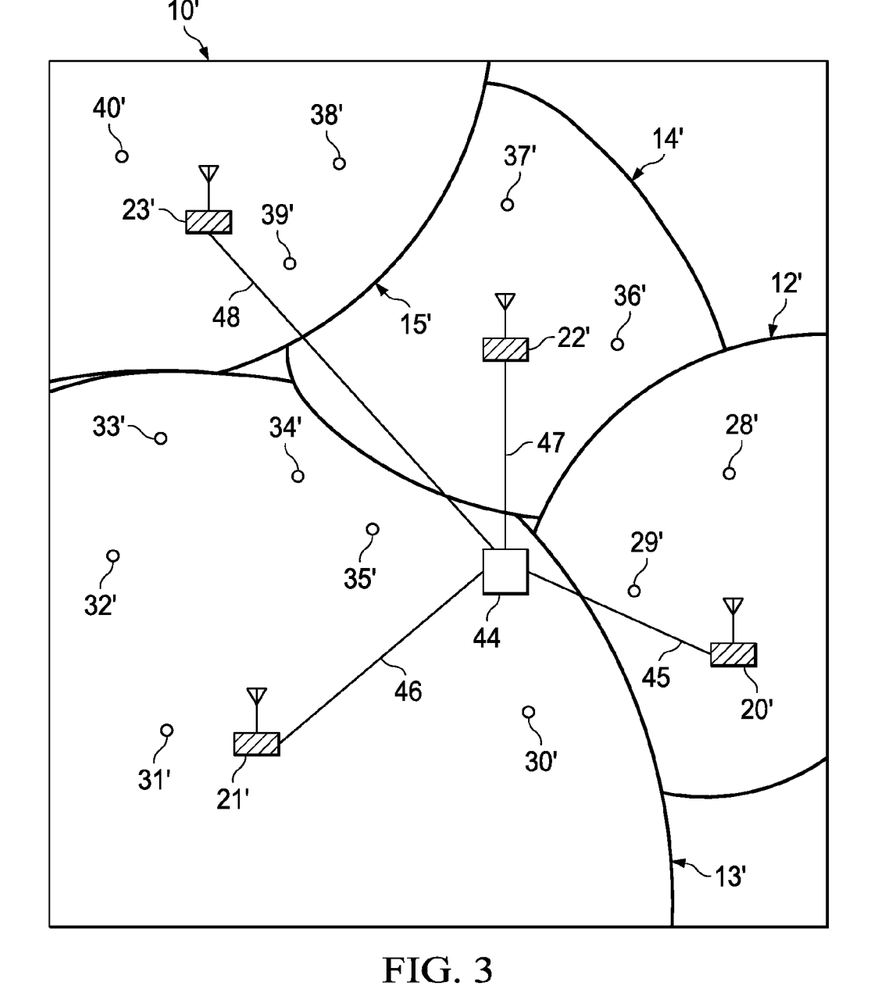
FIG. 3 is a top view of a contiguous spatial coverage region of one embodiment of a cellular communication system.

FIG. 3 shows an exemplary cellular communication system 10' that provides wireless communication links based on spread spectrum technology, e.g., CDMA technology. The cellular communication system 10' includes a plurality of neighboring coverage cells 12', 13', 14', 15'. Each coverage cell 12'-15' has an associated wireless base station 20', 21', 22', 23' that provides bi-directional wireless communication links for nearby wireless communication devices 28', 29', 30', 31', 32', 33', 34', 35', 36,' 37', 38', 39', 40', i.e., wireless fixed devices and/or wireless mobile devices. The wireless base stations 20'-23' link the wireless communication devices 28'-40' to a standard communication network, e.g., a public telephone network. The wireless base stations 20'-23' also transmit supplementary signals with data to the wireless communication devices 28'-40'. The wireless communication devices 28'-40' use this data to set up and control wireless communication links.

The supplementary signals include a primary pilot beam, which defines the boundary of the cell 12'-15' covered by the wireless base station 20'-23' that transmits the primary pilot beam. The primary pilot beam enables wireless fixed or mobile device 28'-40' to set up and maintain spread spectrum communications with the wireless base stations 20'-23' that transmit the primary pilot beams. Each primary pilot beam transmits, e.g., a digital chip sequence that wireless fixed and/or mobile devices 28' 40' use to set up and synchronize a voice and/or data communication link with the associated wireless base station 20'-23'. The primary pilot beam of a cell "r" may also have a transmission pilot power, $T_r$, that is known by the wireless fixed and/or mobile devices 28'-40'. Then, each wireless fixed or mobile device "m" can measure the received power from the primary pilot beam and take a ratio of the measured power over the known transmission pilot power, $T_r$, to determine the path gain, $\alpha_{m,r}$, between itself and the wireless base stations "r" that transmitted the primary pilot beam.

The supplementary signals include a secondary pilot beam or other wireless signal that transmits supplementary information from the wireless base stations 20'-23' to the wireless communication devices 28'-40' that receive the primary pilot beams. The supplementary information may be data indicative of the shadow prices associated with individual ones of the wireless base stations 20'-23'. For example, the supplementary data may be a list of shadow prices and corresponding wireless base stations 20'-23', wherein the list relates to the wireless base stations 20'-23' located in a region near the receiving wireless communication device 28'-40'. The supplementary information may also be data derived from the set of shadow prices, e.g., candidate assignments of individual wireless communication devices 28'-40' to specific base stations 20'-23'. The wireless communication devices 28'-40' use the supplementary information to update their selections of wireless links with specific ones of the wireless base stations 20'-23'. In particular, the wireless communication devices 28'-40' will re-evaluate their own current selection for one or more specific wireless base stations 20'-23' with whom they have a wireless voice or data communication link, and some of the wireless communication devices 28'-40' may change their selections responsive to the received supplementary information. These "base station reassignments" by some wireless communication devices 28'-40' are performed in a manner that reduces load imbalances between nearby ones of the wireless base stations 20' 23'. Nevertheless, this dynamical reassignment of voice or data communication links does not involve cell breathing, because the power levels of primary pilot beams are not varied during this "base station reassignment" process. Thus, the process does not produce coverage holes in the spatial region initially covered by the cells 12'-15'.

For voice communications in which powers for wireless downlinks can vary, the load, $L_r$, of a wireless base station "r" relates to the total transmit power for wireless downlinks from the wireless base station "r" to wireless communication devices. The load $L_r$ satisfies $L_r = \Sigma_m P_{m,r}$ where the sum is over all wireless communication devices that have a wireless communication link with the wireless base station "r". That is, $L_r$ is the total wireless downlink transmission power that the wireless base station "r" generates.

Each wireless fixed or mobile device 28'-40' also transmits supplementary data to one or more of the wireless base stations 20'-23'. For a wireless fixed or mobile device "m", the supplementary data may include a set of path gains $\{\alpha_{m,r}\}$ between itself and nearby wireless base stations 20'-23'. Alternatively, the supplementary information may include data suitable for calculating the wireless fixed or mobile device's set of $\alpha_{m,r}$'s. Such suitable data may include received strengths of various primary pilot beams at the wireless fixed or mobile device "r". For the wireless fixed or mobile device "m", the supplementary information may also include values of the thermal noise power, $n_m$, and the interference, $I_m$, at the wireless fixed or mobile device "m". For a wireless fixed or mobile device "m" the supplementary information may also include a signal-to-noise and interference ratio (SINR), $\gamma_m$, that is required by the wireless fixed or mobile device "m". Herein, the value of an SINR, $\gamma_m$, is the required minimum ratio of downlink signal power received at wireless fixed or mobile device "m" over the sum of the noise and interference powers, i.e., $(n_m + I_m)$. The values of the SINR's may also be known by the wireless base stations 12'-15' and thus, not part of the supplementary information supplied by the wireless fixed or mobile devices 28'-40'.

In various embodiments, the cellular communication system 10' uses a set of shadow prices $\{\lambda_r\}$ to cause dynamical re-selections of the communication links between the wireless fixed and/or mobile devices 28'-40' and the wireless base stations 20'-23'. In particular, the cellular communication system 10' updates the specific shadow price, $\lambda_r$, which are assigned to each wireless base station "r", in a manner that causes reductions of imbalances between the total downlink transmission powers of individual ones of the wireless base stations 20'-23'.

The updating of shadow prices may be done by individual wireless base stations 20'-23' or by a centralized controller 44 that is connected to the wireless base stations 20'-23' via communication channels 45, 46, 47, 48. In either case, the wireless base stations 20'-23' in the contiguous coverage region exchange information, e.g., their total downlink power loads and/or values of their shadow prices, with each other or the centralized controller 44 to enable updates of the shadow prices.

In some embodiments, the wireless fixed and/or mobile devices 28'-40' are configured to receive wireless transmissions with supplementary information that is indicative of the shadow prices. These wireless transmission are typically from one or more of the wireless base stations 20'-23', e.g., from the wireless base stations 20'-23' that are near the wireless fixed and/or mobile devices 28'-40'. The wireless fixed and/or mobile devices 28'-40' may, e.g., extract this supplementary information from secondary pilot beams or from variations in power differences between primary and secondary pilot beams. Based on the supplementary information indicative of shadow prices, each wireless fixed or mobile device 28'-40' selects to set up or maintain a wireless link with individual ones of the wireless base stations 20'-23'. In particular, one of the wireless fixed and/or mobile devices 28'-40' may be configured to change its earlier selection to have or not have a wireless link with one of the wireless base stations 20'-23' in response to the shadow price of the one of the wireless base stations 20'-23' having substantially changed in size. For example, the wireless fixed and/or mobile devices 28'-40' may be configured with a tendency to change their selections from wireless base stations with larger shadow prices to the wireless base stations 20'-23' with lower shadow prices. Such a tendency would cause self-initiated base station reassignments, which tend to reduce power loads on those wireless base stations with larger shadow prices.

Figure 4:
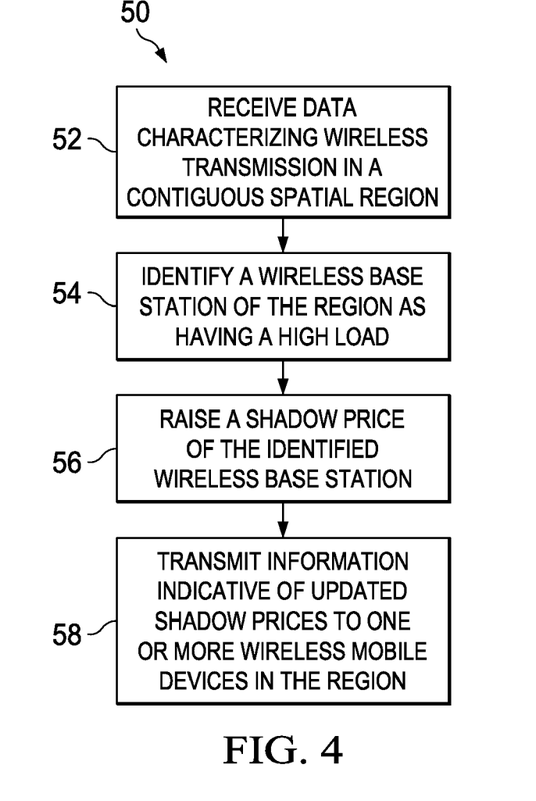
FIG. 4 is a flow chart illustrating steps performed by wireless base stations and/or central controller to implement a method for reducing power load imbalances between wireless base stations of a cellular communication system.
Figure 5:
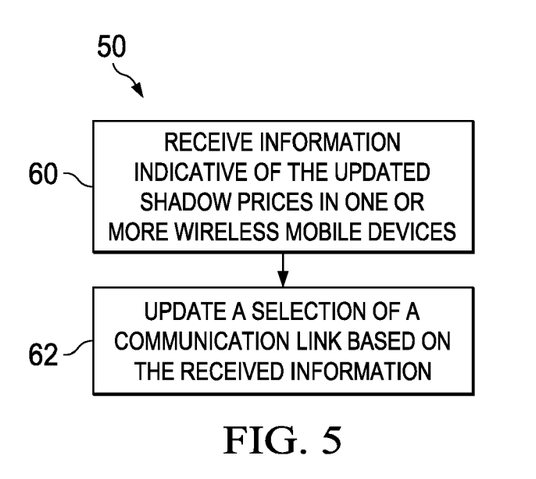
FIG. 5 is a flow chart illustrating steps performed by wireless fixed and/or mobile devices to reduce power load imbalances between the wireless base stations of the cellular communication system according to the method of FIG. 4.

FIGS. 4 and 5 illustrate an exemplary method 50 of operating the cellular communication system 10' to reduce power load imbalances between different ones of the wireless base stations 20'-23'. The method 50 is configured to reduce one of a variety of types of power load imbalances between the wireless base stations that service a selected contiguous spatial coverage area. The method 50' may, e.g., reduce the power load of the single base station with the highest total downlink transmission power load in the selected region. Alternatively, the method 50 may, e.g., reduce the power loads of base stations operating at critically high output powers in the selected region. For example, the method 50 may be configured to reduce power loads of those wireless base stations whose total power loads are extreme. Extreme loads may, e.g., include those power loads that are currently in the highest 5%, 3%, or 1% for the wireless base stations of the selected contiguous coverage area. Alternately, extreme loads may be those power loads that are within 5%, 3%, or 1% of the maximum power for the downlink transmission amplifier of the associated wireless base station. Alternatively, the method 50 may, e.g., reduce such imbalances by making downlink power loads of different ones of the base stations more equal. The method 50 may, e.g., reduce the power loads of a selected number of the wireless base stations with the highest power loads and/or increase the power loads of a selected number of base stations with the smallest total power loads in the selected region.

Referring to FIG. 4, the method 50 includes receiving data that characterizes transmission properties of the selected contiguous spatial coverage region of the cellular communication system 10' (step 52). This transmission data includes total power loads, $\{L_r\}$ received from wireless base stations 20'-23' and may include supplementary data on the wireless fixed and/or mobile devices 28'-40'. The supplementary data may include the $\alpha_{m,r}$'s, $\eta_m$'s, and $I_m$'s, which are determined by the wireless fixed and/or mobile devices 28'-40' and then, transmitted to one or more of the wireless base stations 20'-23' of the selected contiguous spatial coverage region. The method 50 includes identifying one of the wireless base stations "r" as having a higher load, $L_r$, than other of the wireless base stations of the selected contiguous spatial coverage region in response to receiving the transmission data (step 54). The identifying step involves comparing the power loads, $L_r$, of various pairs of the wireless base stations 20'-23' in the selected contiguous spatial coverage region. The method 50 includes raising the shadow price, $\lambda_r$, of the wireless base station, r, identified as having the highest load (step 56). Here, each shadow price, $\lambda_s$, is positive and is a monotonic function of the power load of the corresponding wireless base station "r". In particular, the shadow price, $\lambda_r$, increases as the power load of the corresponding wireless base station "r" increases. The raising step may also include raising the shadow price of one or more other wireless base stations 20'-23' with large power loads. The method 50 includes making wireless transmissions of information indicative of the updated shadow prices to the wireless fixed and/or mobile devices 28'-40' in the selected contiguous spatial coverage region (step 58). The information indicative of the updated shadow prices may, e.g., be a list of pairs of changed shadow prices and corresponding base stations or may be a complete list of the pairs of changed shadow prices and corresponding base stations. Alternately, the data representative of the updated shadow prices may be updated assignments of wireless communication links between the wireless fixed and/or mobile devices 28'-40' and the wireless base stations 20'-23'.

Referring to FIG. 5, the method 50 includes receiving the information indicative of the updated shadow prices at one or more of the wireless fixed and/or mobile devices 28'-40' (step 60). The information is received via the wireless transmissions from one or more of the wireless base stations 20'-23' of the selected contiguous region. The method 50 includes having one or more of the wireless fixed and/or mobile devices 28'-40' update its own selection of specific wireless base stations 20'-23' for wireless communication links based on the received information indicative of the updated shadow prices (step 62). The method 50 is such that the wireless fixed and/or mobile devices 28'-40' tend to select wireless communication links with wireless base stations 20'-23' that have lower shadow prices. That is, the wireless fixed and/or mobile devices 20'-23' migrate their selections of wireless communication links from the wireless base stations 20'-23' in a manner that more equally distributes loads among the wireless base stations 20'-23' while maintaining SINR requirements.

If the shadow price of a wireless base station 20'-23' is high, wireless fixed and/or mobile devices 28'-40' will tend to switch their communication links to neighboring wireless base stations 20'-23' with lower shadow prices. For that reason, raising the shadow price of a heavily loaded wireless base station will cause its power load to be reduced. Nevertheless, the reduction of load imbalances between the wireless base stations 20'-23' does not involve cell-breathing, because the primary pilot powers are not changed during the process of updating the selections of wireless communication links. For that reason, the risk that updates of assignments of wireless fixed and/or mobile devices 28'-40' to wireless base stations 20'-23' will cause coverage holes is very low.

An alternate embodiment modifies steps 54 and 56 of the method 50. The altered step 54 involves identifying the wireless base station 20'-23' with the lowest load of the selected contiguous spatial coverage region. The altered step involves lowering the shadow price of the wireless base station 20'-23' identified as having the lowest load.

Another alternate embodiment combines both of the above-described methods. In this embodiment, step 54 involves identifying the wireless base stations 20'-23' with the highest power load and identifying the wireless base stations with the lowest power load in the selected contiguous spatial coverage region. In this embodiment, step 56 involves both raising the shadow price of the wireless base station 20'-23' identified as having the highest power load and lowering the shadow price of that wireless base station 20'-23' identified as having the lowest power load.

Figure 6:
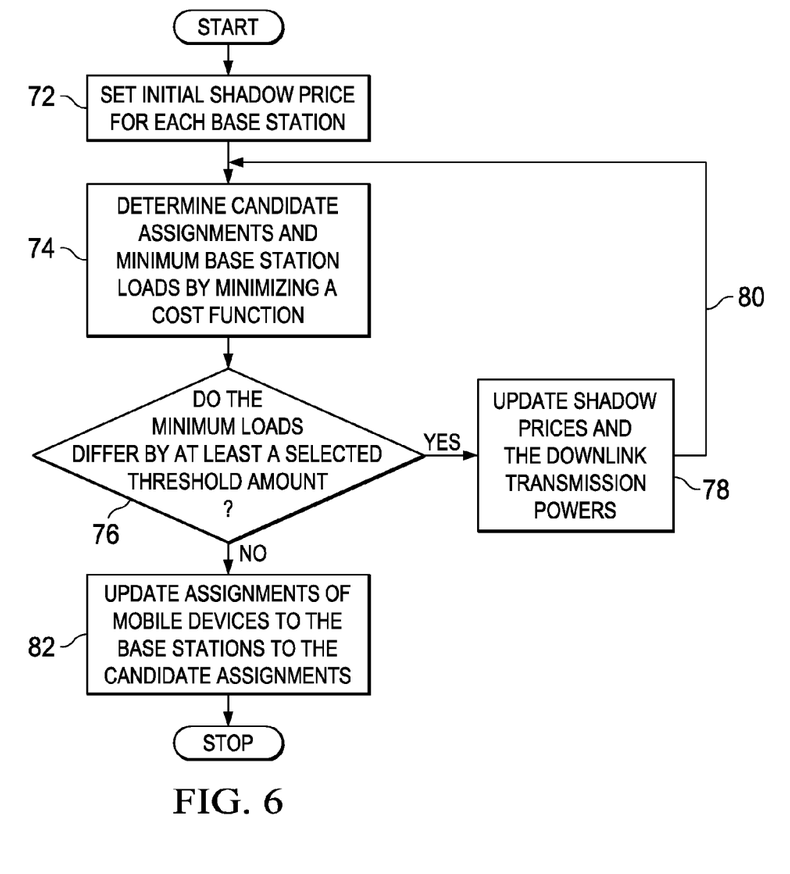
FIG. 6 is a flow chart for a method selecting wireless communication links in a manner that tends to reduce power load imbalances between different wireless base stations in a cellular communication system.

Another method 70 iteratively updates the entire set of shadow prices, $\{\lambda_r\}$, to determine an optimal assignment of the wireless fixed and/or mobile devices 28'-50' to specific base stations 20'-23'. The optimal assignment substantially equalizes loads, $L_r$, between the different wireless base stations 20'-23' and is illustrated in FIG. 6. The method 70 implements a method for solving a linear programming problem, which may, e.g., be solved using simplex methods.

The method 70 includes setting initial values for the shadow price, $\lambda_r$, associated with each wireless base station, r, in a selected spatially contiguous coverage region (step 72). The shadow prices are typically constrained to sum to 1. As an example, if the selected contiguous region has N wireless base stations, the initial values may satisfy $\lambda_r = 1/N$ for each wireless base station "r" in the selected spatially contiguous coverage region.

The method 70 includes determining candidate assignments of wireless fixed and/or mobile devices 28'-40' to specific wireless base stations 20'-23', i.e., candidate assignments of wireless communication links (step 74). The determinations of the candidate assignments are made such that associated downlink transmit powers, $P_{m\,s}(\lambda_1 \ldots \lambda_N)$ minimize a cost function, $V(\lambda_1 \ldots \lambda_N)$. The cost function is linear in the power loads and is defined by $V(\lambda_1, \lambda_2, \ldots \lambda_N) = \Sigma_{r=1\ldots N}[\lambda_r L_r]$. The step of determining the candidate assignments and downlink transmit powers, $P_{m\,s}(\lambda_1 \ldots \lambda_N)$, respects the SINR requirements of the wireless fixed and/or mobile devices 28'-40'. For a wireless fixed or mobile device the associated SINR requirement is a linear constraint in the downlink transmission powers and is defined by the relation $\Sigma_{r=1\ldots N} P_{m\,r} \alpha_{m\,r} \geq \gamma_m(\eta_m + I_m)$. Here, the sum is over the wireless base stations "r" of the selected contiguous spatial coverage region. The "equality" solutions of these constraint inequalities define the minimum allowed downlink transmission powers, $P_{m\,s}(\lambda_1 \ldots \lambda_N)$. The solutions of these constraints, which minimize the cost function, V, determine the loads, $L_s(\lambda_1 \ldots \lambda_N)$, i.e., $L_s(\lambda_1 \ldots \lambda_N) = \Sigma_m P_{m\,s}(\lambda_1 \ldots \lambda_N)$. In definitions of the $L_s(\lambda_1 \ldots \lambda_N)$'s, the sums are over the wireless fixed and/or mobile devices that have candidate assignments to wireless base station "s". These relations include the possibility that a wireless fixed or mobile device "m" may have a candidate assignment to one or to several wireless base stations.

The method 70 includes comparing the minimum loads, $L_s(\lambda_1 \ldots \lambda_N)$, for pairs of the wireless base stations to determine whether these loads differ by more than a selected threshold amount (step 76).

The method 70 includes updating the shadow prices and minimum downlink transmission powers in response to the minimum loads of a pair of the wireless base stations 20'-23' differing by at least the selected threshold amount (step 78). After the updating, the method 70 involves looping back 80 and iterating the performance of steps 74 and 76 based on the updated values. At each iteration "j+1" of the loop back 80, the updated shadow price, $\lambda_r^{j+1}$, of a wireless base station "r" is iteratively defined by:

$$\lambda_r^{j+1} = \lambda_r^j + \rho_j[L_m(\lambda_1^j \ldots \lambda_N^j) - \langle L_m(\lambda_1^j \ldots \lambda_N^j)\rangle].$$

Here, the $\lambda_r^0$'s are the initial shadow prices, e.g., 1/N, and $\langle L_m(\lambda_1^j \ldots \lambda_N^j)\rangle$ is an average of the load over the N wireless base stations 20'-23' of the selected contiguous spatial coverage region. In the sequence of iterations, the $\rho_j$-factors provide convergence and may be selected to satisfy:

$$\rho_j \xrightarrow[j\to\infty]{} 0 \text{ and } \sum_{j=1}^{\infty} \rho_j = \infty$$

At each iteration (j+1) of the loop back 80, step 74 involves starting the search to minimize downlink transmission powers, $P_{m\,s}(\lambda_1^j \ldots \lambda_N^j)$, from initial downlink transmission powers, $P_{m\,s}^j$, that are defined by:

$$P_{m\,s}^{j+1} = [1-\sigma_j]P_{m\,s}^j + \sigma_j P_{m\,s}(\lambda_1^j \ldots \lambda_N^j) \text{ where }$$
$$\sigma_j = \rho_j\{\Sigma_{i=1}^j[\rho_i]\}^{-1}.$$

Using the above-described $\rho_j$-factors and initial downlink transmission powers, $P_{m\,s}^{j+1}$, at each iteration causes loads and powers to converge with the number of iterations such that differences among the loads of different ones of the wireless base stations are substantially minimized as the number of iterations grows.

If minimum loads of pairs of wireless base stations differ by less than the preselected threshold amount, the method includes updating actual assignments of the wireless fixed and/or mobile devices 28'-40' to the wireless base stations 20'-23' to be the candidate assignments as determined at that the last iteration (step 82). The updating step includes transmitting control information between hardware devices so that both the wireless fixed and/or mobile devices 28'-40' and the relevant wireless base stations 20'-23' learn or are able to determine the updated assignments of wireless fixed and/or mobile devices 28'-40' to specific wireless base stations 20'-23'. The transmitted control information also enables the wireless base stations 20'-23' to determine downlink transmission powers, i.e., $P_{m\,s}(\lambda_1^k \ldots \lambda_N^k)$'s, for the wireless fixed and/or mobile devices 28'-40' that are assigned wireless links to them. That is, each wireless base station "s" can determine the $P_{m\,s}(\lambda_1^k \ldots \lambda_N^k)$'s for the wireless fixed and/or mobile devices "m" assigned to it at the final iteration "k".

Alternate methods obtain candidate assignments of wireless downlinks by performing a preselected number of repetitions of the steps 74 and 78 of method 70. In such methods, the step 76 simply counts the number of times that the step 74 has been performed and directs execution of the method to step 82 after the preselected number of repetitions of the steps 74 and 78. In such methods, the $\rho_j$-factors are simply selected to have small values. Such methods can provide for tracking of dynamically varying transmission conditions and may be advantageous if local conditions vary substantially and rapidly in time. In these embodiments, the various characteristics in the method 70 are effectively considered to be time dependent.

Different embodiments of method 70 involve performing, steps 72, 74, 76, 78, 80, and 82 in different hardware devices. For example, these steps may be performed in central controller 44 or in individual ones of the wireless base stations 20'-23'. Also, some or all of these steps may be performed in the wireless fixed and/or mobile devices 28'-40' themselves. In various embodiments, distributing the performance of some of the steps 72, 74, 76, 78, 80, and 82 to the wireless fixed and/or mobile devices 28'-40' may reduce required supplementary data transfers thereby enabling the assignments of wireless communication links to be updated more often and/or to be updated with a lower supplementary data overhead.

In method 70 of FIG. 6, at least two methods are available to minimize the cost function, $V(\lambda_1 \ldots \lambda_N)$ at the step 74.

In the first method, the candidate assignments of the wireless fixed and/or mobile devices 28'-40' to specific wireless base stations 20'-23' are based on fixed upper bounds for the interference powers, $I_m$. In particular, the $I_m$'s, are assumed to not vary with downlink transmission powers at neighboring wireless base stations 20'-23'. From the fixed upper bounds, the method involves making a candidate assignment of each wireless fixed or mobile device to the single wireless base station "s" that provides the minimum value for $\lambda_m/\alpha_{m\ r}$. Here, the $\lambda_m$'s refer to the shadow prices evaluated at the iteration under consideration. Since the associated SINR constraints demand minimum downlink transmission powers of $\gamma_m(\rho_m + I_m)/\alpha_{ms}$, the total load on the wireless base station "s" is given by $\Sigma_m \lambda_m [\gamma_m (\rho_m + I_m)/\alpha_{m\ s}]$. Here, the sum is over wireless fixed and/or mobile devices "m" that have candidate assignments to wireless base station "s". If the $[\gamma_m (\rho_m + I_m)/\alpha_{m\ s}]$'s are independent of downlink transmission powers at other wireless base stations, such a scheme assigns each wireless fixed and/or mobile device to the wireless base station that satisfies the associated SINR constraint and has the lowest shadow price.

In the second method, candidate assignments of the wireless fixed and/or mobile devices 28'-40' to specific wireless base stations 20'-23' are not based on such an upper bound the interference powers at individual wireless fixed or mobile devices. Instead, the second method determines the candidate assignments by solving a power-control problem with the Yates-Hanly fixed-point algorithm. The Yates-Hanly fixed-point algorithm is, e.g., discussed in U.S. Pat. No. 5,697,053 and U.S. Patent Publication No. 2002/0160767A1 both of which are incorporated herein by reference in their entirety.

The second method determines the candidate assignments by performing a series of steps on a set of conjugate variables, $\mu_m$, wherein one $\mu_m$, is associated with each wireless fixed or mobile device 28'-40' in the selected contiguous spatial coverage region. The first step involves assigning the $\mu_m$'s of the selected contiguous spatial coverage region initial values, e.g., zero. The second step involves iteratively updating the $\mu_m$'s of the selected contiguous spatial coverage region. The updates are stopped when the magnitudes of the differences between the p-th value of each conjugate variable, $\mu_m^p$, and the earlier (p−1)-th value of the same variable, i.e., $\mu_m^{p-1}$, are less than a preselected convergence threshold. During this iterative step, the (p+1)-iteration defines the conjugate variables by the following replacements:

$$\mu_m^{p+1} = \min_{cells"r"} \gamma_m \left[ \sum_{m'=1}^{N} \alpha_{m'r}\mu_{m'}^p + \lambda_r/\gamma_{m'} \right] \alpha_{mr}^{-1}.$$

Here, the sum is over all wireless fixed and/or mobile devices "m'" of the selected region except the wireless fixed or mobile device "m" whose conjugate variable, $\mu_m$, is being updated. The third step involves making a candidate assignment of the wireless fixed and/or mobile devices 28'-40' to the wireless base stations 20'-23'. Each wireless fixed or mobile device "m" gets a candidate assignment to the wireless base station "r" that minimizes the following expression:

$$\left[ \sum_{m'=1}^{N} \alpha_{m'r}\mu_{m'} + \lambda_r/\gamma_{m'} \right] (\alpha_{mr})^{-1}.$$

The fourth step involves calculating the downlink transmission powers, $P_{m\ r}$, for each wireless fixed or mobile device "m" from the wireless base station "r". Based on the candidate assignments, the downlink transmission powers are calculated by solving the following equation:

$$\alpha_{mr}P_{mr} = \gamma_m \left[ \sum_{s \neq r} \left\{ \alpha_{ms} \sum_n P_{ns} \right\} + \eta_m \right].$$

Here, the second sum is over the wireless fixed and/or mobile devices "n" having a candidate assignment to the wireless base station "s". The above equation for the downlink transmission powers may be solved by a variety of methods known to those of skill in the art, e.g., iterative methods.

Figure 7:
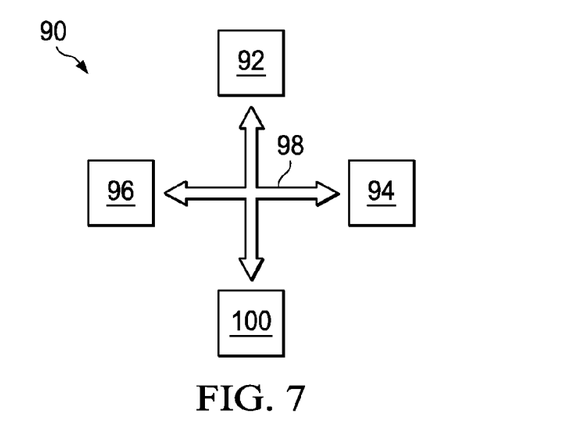
FIG. 7 illustrates a hardware device for implementing methods of FIG. 4, 5, or 6 in a wireless fixed or mobile device, a wireless base station, and/or a central controller of a cellular communication system.

FIG. 7 illustrates a hardware device 90 for implementing various ones of the above-described methods or method steps in the wireless base stations 20'-23', central processor 45, or wireless fixed and/or mobile devices 28'-40' of FIG. 3 or in some combination of these hardware devices. The hardware device 90 includes a digital processor 92; a random access memory 94; a program storage device 96, e.g., a magnetic or optical disk, read-only memory, or a hard drive; and one or more internal digital data buses 98. The hardware device 94 also includes one or more wireless communication devices 100 for exchanging control-related data, e.g., $\lambda_m$'s, $L_r$'s, and/or $\alpha_{m\ r}$'s with other hardware devices, i.e., wireless base stations 20'-23', the central processor 45, and/or the wireless fixed and/or mobile devices 28'-40'. The program storage device 96 and random access memory store processor-executable programs of instructions for performing one or several of the steps of the methods 50, 70 of FIGS. 4-7.

From the disclosure, drawings, and claims, other embodiments of the invention will be apparent to those skilled in the art.

What is claimed is:

1. A system, comprising:
a plurality of wireless base stations located in a contiguous spatial coverage region of a cellular communication system, each wireless base station being configured to generate a coverage pilot beam to enable wireless mobile devices to set up wireless communication links with the generating wireless base station;
wherein the wireless base stations are configured to transmit data to wireless mobile devices to cause a portion of the wireless mobile devices to select ones of the wireless base stations for wireless communication links in a manner that reduces power load imbalances between the wireless base stations;

wherein at least one of the wireless base stations is configured to employ a secondary pilot beam to transmit the data that is a different beam than the coverage pilot beam transmitted by the at least one of the wireless base stations; and wherein the transmitted data is indicative of a set of shadow prices, each of the wireless base stations is associated with a corresponding one of the shadow prices.

2. The system of claim 1, wherein each wireless base station is configured to receive data indicative of path gains from the wireless mobile devices.

3. The system of claim 1, wherein the system is configured to change the shadow price of a wireless base station responsive to the power load of the wireless base station changing.

4. The system of claim 1, wherein the system is configured to update the shadow prices in a manner that causes the wireless mobile devices to reselect wireless base stations for the wireless communication links in a manner that reduces loads of the wireless base stations having largest current loads.

5. The system of claim 1, wherein the wireless mobile devices are configured to extract the shadow prices from the secondary pilot beams.

6. The system of claim 1, wherein the wireless base stations do not perform cell breathing when the portion of the wireless mobile devices select ones of the wireless base stations for wireless communication links.

* * * * *